United States Patent
Del Re et al.

(10) Patent No.: US 7,175,886 B2
(45) Date of Patent: Feb. 13, 2007

(54) APPARATUS AND METHOD FOR MICRON AND SUBMICRON PARTICLE FORMATION

(75) Inventors: Giovanni Del Re, Monteluco di Roio (IT); Matteo Putrignano, Monteluco di Roio (IT); Gabriele Di Giacomo, Monteluco di Roio (IT); Cesare Di Palma, Monteluco di Roio (IT)

(73) Assignee: Dompe' pha.r.ma S.p.A., L'Aquila (IT)

( * ) Notice: Subject to any disclaimer, the term of this patent is extended or adjusted under 35 U.S.C. 154(b) by 105 days.

(21) Appl. No.: 10/468,127

(22) PCT Filed: Feb. 26, 2002

(86) PCT No.: PCT/GB02/00840

§ 371 (c)(1),
(2), (4) Date: Jan. 8, 2004

(87) PCT Pub. No.: WO02/068107

PCT Pub. Date: Sep. 6, 2002

(65) Prior Publication Data

US 2004/0107901 A1 Jun. 10, 2004

(30) Foreign Application Priority Data

Feb. 26, 2001 (EP) ................. 01104705

(51) Int. Cl.
*B05D 1/00* (2006.01)
(52) U.S. Cl. ............................... 427/427.1
(58) Field of Classification Search ............ None
See application file for complete search history.

(56) References Cited

U.S. PATENT DOCUMENTS 4,368,100 A   1/1983   Pyves et al.
4,416,600 A   11/1983  Leznar et al.

(Continued)

FOREIGN PATENT DOCUMENTS

CN          1528505     *    9/2004

(Continued)

OTHER PUBLICATIONS

Jung et al, Journal of Suprecritical Fluids, 20(3), pp. 179-219, 2001.*

(Continued)

*Primary Examiner*—Erma Cameron
(74) *Attorney, Agent, or Firm*—Lowe Hauptman & Berner, LLP

(57) ABSTRACT

An apparatus is described for micron and submicron particles formation of a substance using the GAS process, comprising a particles formation vessel (22) and means for introducing a solution of the substance and a supercritical fluid into the particles formation vessel (22), wherein said means comprise a nozzle (27) having a central orifice (39) serving to carry a flow of solution, and a plurality of separate outer orifices (41) serving to carry a flow of pure supercritical fluid or a flow of supercritical fluid mixed with a modifier, such that the solvent is extracted from the solution by the supercritical fluid and precipitation of micron and submicron particles occurs. Also a process is described, carried out with such an apparatus.

25 Claims, 14 Drawing Sheets

U.S. PATENT DOCUMENTS

| | | | |
|---|---|---|---|
| 4,576,111 A | | 3/1986 | Slomianny |
| 5,301,664 A | * | 4/1994 | Sievers et al. .......... 128/200.23 |
| 5,601,781 A | | 2/1997 | Miller et al. |
| 5,770,559 A | * | 6/1998 | Manning et al. ................ 514/2 |
| 5,795,594 A | * | 8/1998 | York et al. .................. 424/489 |
| 5,804,066 A | | 9/1998 | Mueggenburg et al. |
| 5,833,891 A | * | 11/1998 | Subramaniam et al. ........ 264/7 |
| 5,851,453 A | * | 12/1998 | Hanna et al. ................... 264/5 |
| 5,874,029 A | | 2/1999 | Subramaniam et al. |
| 5,921,478 A | | 7/1999 | Kamiwano et al. |
| 6,063,910 A | | 5/2000 | Debenedetti et al. |
| 6,116,516 A | | 9/2000 | Ganan-Calvo |
| 6,630,121 B1 | * | 10/2003 | Sievers et al. ............. 424/1.13 |
| 2002/0073511 A1 | * | 6/2002 | Hanna et al. ............. 23/295 R |
| 2005/0085409 A1 | * | 4/2005 | Kordikowski et al. ......... 514/2 |

FOREIGN PATENT DOCUMENTS

| | | |
|---|---|---|
| GB | 2 322 326 A | 8/1998 |
| WO | WO 95/01221 | 12/1995 |
| WO | WO 95/01324 | 12/1995 |
| WO | 96 00610 A | 1/1996 |
| WO | WO 97/31691 | 4/1997 |
| WO | WO 98/36825 | 8/1998 |
| WO | WO 99/59710 * | 11/1999 |
| WO | 00 10739 A | 3/2000 |
| WO | WO 00/37169 | 6/2000 |
| WO | WO 00/67892 | 11/2000 |
| WO | WO 03/008082 | 1/2003 |

OTHER PUBLICATIONS

Gao et al, Journal of Supercritical Fluids, 13(1-3), pp. 369-374, 1998.*

Nagahama, Chorinkai Saishin Gijutsu, 6, pp. 20-26, 2002.*

Tom et al; "Formation of Bioerodible Polymeric Microspheres and Microparticles by Rapid Exapnsion of Supercritical Solutions"; Biotechnology Prog., vol. 7, pp. 403 to 411. year 1991.

Dixon et al; "Formation of Microporous Polymer Fibers and Oriented Fibrils by Precipitation with a Compressed Fluid Antisolvent"; Journal of Applied Polymer Science, vol. 50, pp. 1929 to 1942, year 1993.

Gallagher et al; "Gas Antisolvent Recrystallization: New Process To Recrystallize Compounds Insluble in Supercritical Fluids"; American Chemical Society, Supercritical Fluid Science and Technology, Chapter 22, pp. 334-354, year 1989.

A.H. Lefebvre, Atomization and Spray, Chapter 1, Hemisphere Pub. Corp. 1989.

A.H. Lefebvre, Atomization and Spray, Chapter 2, Hemisphere Pub. Corp. 1989.

A.H. Lefebvre, Atomization and Spray, Chapter 4, Hemisphere Pub. Corp. 1989.

A.H. Lefabvre, Atomization and Spray, Chapter 6, Hemisphere Pub. Corp. 1989.

* cited by examiner

SEM fotomicrograph of trehalose produced at conditions of example 3

SEM fotomicrograph of trehalose produced at conditions of example 3

FIG. 14

Particle size distribution of trehalose produced at conditions of example 3

APPARATUS AND METHOD FOR MICRON AND SUBMICRON PARTICLE FORMATION

FIELD OF THE INVENTION

The present invention relates to an apparatus and method of forming very fine particles of chemical compounds using fluid antisolvent precipitation. More particularly but not exclusively it relates to a method of forming micro particles of proteins, for example proteins of pharmaceutical interest.

BACKGROUND OF THE INVENTION

A large number of industries are interested in the production of micron and submicron particles for different applications. The need for an apparatus and a method to produce submicron particles is particularly pronounced in the pharmaceutical field.

There are several reasons for employing drugs as fine powders in pharmaceutics, such as the need to improve the bioavailability or the requirements for specific pharmaceutical forms (nasal, ophthalmic, injectables, modified release), etc.

The conventional techniques for particle size reduction (grinding, milling, spray drying, freeze drying) present many disadvantages, in particular for biological active principles. For instance during the initial step of freeze drying, the drug (protein) and the buffer and other ingredients tend to concentrate leading to changes in pH and ionic strength; this can cause protein denaturation. Concerning spray drying, the main limitations of this technique are essentially high costs, thermal degradation and low efficiency with low yield and high levels of residual moisture.

Within the last decade, different processes have been proposed for micron and submicron particles formation by utilizing supercritical fluid techniques (RESS, GAS, SEDS, PGSS (Precipitation from Gas Saturated Solution)).

These processes have received considerable attention, because they allow homogeneous particles with a diameter smaller than 1 micron to be obtained. In addition these processes allow very good control of size and morphology of powders, the compounds are not subject to mechanical and thermal shock, and the powders obtained are free of any solvent.

Two processes for obtaining micro-particles by supercritical fluids have attained high interest: Rapid Expansion of Supercritical Solutions (RESS) process (Tom, J. W., Debenedetti, P. G. "The formation of bioerodible polymeric microsphere and micro particles by rapid expansion of supercritical solutions" BioTechnol. Prog. 1991, 7, 403–411.) and Gas Anti-Solvent recrystallization (GAS) process (Gallagher, P. M., Coffey, M. P., Krukonis, V. J., Klasutis, N., Am. Chem. Symp. Ser., 1989, No. 406).

In the RESS process the substance of interest is solubilized in a supercritical fluid and the solution is sprayed into a particle formation vessel through a nozzle: rapid expansion of the supercritical solution causes the precipitation of the solute. In some applications it is possible to add a subcritical solvent (modifier) to the supercritical fluid.

A drawback of this technique is that only a few compounds are soluble enough in supercritical fluids, even if a modifier is used. In addition the rapid expansion of supercritical solution through the nozzle can cause the freezing of supercritical fluid and the blockage of the nozzle.

In the GAS process a solute of interest is dissolved in a liquid solvent that is miscible with supercritical fluid, while the solute is not soluble in the supercritical fluid.

The solution is sprayed through a nozzle into a particle formation vessel which is pressurized with supercritical fluid. The rapid and intimate contact between solution and supercritical fluid causes the extraction of solvent from solution in the supercritical fluid and leads to the precipitation of solute as micro-particles. It is possible to enhance the solubility of the liquid solvent in the supercritical fluid by using a modifier. The GAS process overcomes the drawbacks of the RESS process and allows a better control of process parameters.

The crucial step of the GAS process is the mixing of solution and supercritical fluid: in order to obtain an intimate and rapid mixing a dispersion of solution as small droplets into the supercritical fluid is required. Different devices have been proposed to inject solution and supercritical fluid into particle formation vessel in order to obtain a good mixing.

A simple capillary nozzle with a diameter between 0.1 and 0.2 mm has been used first (Dixon D. J. and Johnston K. P., *Formation of microporous polymer fibers and oriented fibrils by precipitation with a compressed fluid antisolvent*, J. App. Polymer Sci., 50, 1929–1942, 1993).

This device shows high pressure drop along its length leading to a poor conversion of pressure into kinetic energy at the capillary outlet.

Debenedetti P. G., Lim G. B., Prud'Homme R. K. (U.S. Pat. No. 006,063,910, May 16, 2000) use the GAS process to form protein micro particles. In this case the protein solution is sprayed through a laser drilled platinum disc with a diameter of 20 micron and a length of 240 micron inside the particles formation vessel containing the supercritical fluid which is introduced by a different inlet. The laser-drilled platinum disc has an outside diameter of 3 mm, a thickness 0.24 mm, and the orifice is 20 micrometers in diameter. This technique has been used to form particles of catalase and insulin (0.01% w/v) from ethanol/water (9:1 v/v) solutions using carbon dioxide as supercritical fluid. The experiments were carried out at 8.8 MPa and 35° C.; supercritical fluid flow rate was about 36 g/min and the solution flow rate was about 0.35 cc/min.

Compared to a capillary nozzle, the laser drilled disc presents one main advantage: the ratio between length and diameter of the orifice allows minimizing of the pressure drop and energy pressure is almost completely converted into kinetic energy; in such a way, very high solution rates and very small droplets can be obtained.

In this process the supercritical fluid inlet is not optimized: the solution injection occurs in an almost static atmosphere of supercritical fluid, with low turbulence.

Subramaniam B., Saim S., Rajewskj R. A., Stella V. (Methods for particle micronization and nanonization by recrystallization from organic solutions sprayed into a compressed antisolvent. U.S. Pat. No. 5,874,029, Feb. 23, 1999) disclose use of a commercial coaxial convergent-divergent nozzle to inject solution into a particle formation vessel. The nozzle has a convergent-divergent passage for the gas expansion and an inner coaxial capillary tube. The solution injected through the coaxial capillary tube is energized by the expanding gas. The gas that expands in the convergent-divergent nozzle can reach supersonic velocities.

The transition from subsonic to supersonic rate in the nozzle leads to the formation of a Mach disc which enhances dispersion of the solution and mixing between solution and supercritical fluid. Subramaniam et al. propose as energizing gas an inert gas as helium or the supercritical fluid. In the cited examples the authors use the supercritical fluid as the energizing gas.

Even if to reach supersonic velocities very high pressure drops of the energizing gas are required (about 40 MPa), the inventors operate at milder conditions, using pressure drops of about 40 bar (4 MPa), so they could not reach supersonic velocities. Notwithstanding, they claim substantial improvements compared to conventional GAS process.

Experimentally they recrystallised hydrocortisone and camptothecin obtaining powders in the range of nanoparticles (0.5–1 µm).

An advantage of this technique is that the supercritical fluid improves the solution spraying in order to obtain very fine droplets; another advantage is due to the intimate mixing between solution and supercritical fluid which occurs in a very small tract, at the nozzle outlet.

The disadvantage of this technique is that the mixing between solution and supercritical fluid occurs before entering into the particle formation vessel: this situation could lead to particle formation before fluids enter into the particles formation vessel and consequently blockage of the nozzle.

Hanna M., York P. (WO patent application No 96/00610, Jan. 11, 1996) propose a new method and a new apparatus to obtain very small particles by supercritical fluid technique named SEDS (Solution Enhanced Dispersion by Supercritical Solution).

The process is based on a new coaxial nozzle: the solution expands through an inner capillary with a diameter of 0.25 mm; the supercritical fluid expands through an external coaxial pathway with a conically tapering end; the diameter of conical zone at the end is about 0.2 mm. The mixing between the supercritical fluid and the solution occurs in the conical zone. They also propose the use of a three ways nozzle: in the added way a modifier can be fed in order to improve the mixing. They apply the SEDS technology for precipitation of small particles of water soluble compounds, namely sugars (Lactose, Maltose, Trehalose and Sucrose) and proteins (R-TEM beta-lactamase).

The modifier (methanol or ethanol) is introduced into the particles formation vessel either together with the solution or, through a different inlet.

This nozzle allows a good and intimate mixing between the supercritical fluid and the solution: the first contact between supercritical fluid and solution occurs in the conical shaped end, the two fluids emerge from the nozzle outlet at high velocity and the supercritical fluid energizes the liquid solution which breaks into small droplets in the particles formation vessel.

The disadvantage of this technique is related to the contact between supercritical fluid and solution before entering into the particles formation vessel; precipitation of the powder could occur in the nozzle and can eventually cause nozzle blockage.

The supercritical fluid velocity at the nozzle outlet is limited by the orifice diameter that is quite large.

It is known from GM-A-2 322 326 to provide modified apparatus for particle formation using the SEDS technique. The apparatus comprises a particle formation vessel and means for introducing a solution of the substance and a supercritical fluid into said particle formation vessel, said means comprising a nozzle having respective passages for the solution and the supercritical fluid and separate outlets at downstream ends of the respective passages, such that in use contact between the solution and the supercritical fluid first occurs in the particle formation vessel downstream of the separate outlets.

STATEMENTS OF INVENTION

The term "supercritical fluid" means a fluid at or above its critical pressure and its critical temperature.

The term "solvent" means a liquid, which is able to form a solution with the substance.

The term "substance" means a solid of pharmaceutical interest which is soluble in the solvent and which is substantially insoluble in the srupercritical fluid.

The term "modifier" means a chemical which enhances solubility of the solvent in the supercritical fluid.

An object of the present invention is to overcome the drawbacks, of the prior art techniques described above.

In particular, it is an object of the present invention to provide a process to obtain fine powders of a substance and an apparatus to make an intimate mixture of substance solution with the supercritical fluid.

Viewed from one aspect the invention provides apparatus for micron and submicron particle formation of a substance using the gas anti-solvent recrystallization (GAS) process, comprising a particle formation vessel and means for introducing a solution of the substance and a supercritical fluid into said particle formation vessel, said means comprising a nozzle having respective passages for the solution and the supercritical fluid and separate outlets at downstream ends of the respective passages, such that in use contact between the solution and the supercritical fluid first occurs in the particle formation vessel downstream of the separate outlets, wherein the passages a wide diameter upstream portion which feeds a narrow diameter downstream portion.

Viewed from another aspect the invention provides a nozzle for the introduction of a solution of a substance and a supercritical fluid in a particle formation vessel for micron and submicron particle formation of said substance using the gas anti-solvent recrystallization process, the nozzle comprising respective passages for the solution and the supercritical fluid and separate outlets at downstream ends of the respective passages, such that in use contact between the solution and the supercritical fluid first occurs downstream of the separate outlets, wherein the passages comprise a wide diameter upstream portion which feeds a narrow diameter downstream portion.

Viewed from a further aspect the invention provides a process for micron and submicron particle formation of a substance using the gas anti-solvent recrystallization. (GAS) process, comprising the feeding of a supercritical fluid, pure or mixed with a modifier, and of a solution, through a nozzle, into a particle formation vessel at controlled pressure and temperature, such that the solvent is extracted from solution by the supercritical fluid and precipitation of micron and submicron particles occurs, wherein the supercritical fluid and is the solution are fed through respective passages of the nozzle to exit therefrom via separate outlets at downstream ends of the respective passages, with contact between the supercritical fluid and the solution first occurring in the particle formation vessel downstream of the separate outlets, and wherein the passages comprise a wide diameter upstream portion which feeds a narrow diameter downstream portion.

The process according to the invention includes the co-introduction into a particle formation vessel of a solution or suspension of the substance in a solvent, of a supercritical fluid and, preferably, of a modifier. The modifier is a compound which is soluble in the solvent and in the supercritical fluid. The modifier is used when the solvent is substantially insoluble with the supercritical fluid, or of low solubility.

When the solubility of the solvent in the supercritical fluid is low, the use of a modifier allows a better mixing between solution and supercritical fluid.

When a modifier is used, the ratio of modifier flow rate and of solution flow rate has to be chosen so as to have a high increase of solubility of solvent in the supercritical fluid. The modifier can be introduced with the supercritical fluid, with the solution or in part with the supercritical fluid and in part with the solution; the way of introduction of the modifier greatly influences the extraction of the solvent and the structure of particles that are formed.

For the precipitation of powders from aqueous solution using carbon dioxide as supercritical solvent and ethanol as modifier the ratio between supercritical fluid flow rate and the modifier flow rate is about 7, while the ratio between modifier flow rate and the solution flow rate is about 20.

Thus, in one case the substance solution and a mixture of supercritical fluid and modifier are separately introduced into the particle formation vessel. The modifier and the supercritical fluid are mixed before the introduction into the particle formation vessel. Alternatively, the modifier may be mixed with the solution before introduction. In another version of the process the modifier is introduced into the particle formation vessel in part with the solution and in part with the supercritical fluid.

If the solvent is miscible with the supercritical fluid, the solution of the substance in the solvent and the supercritical fluid are separately introduced into the particle formation vessel, in which mixing of the supercritical fluid with the solution and extraction of the solvent by the supercritical fluid occur.

The substance is preferably a pharmaceutical compound soluble in the solvent and in the modifier and substantially insoluble in the supercritical fluid.

In the particle formation vessel the substance solution is mixed with the mixture of supercritical fluid and modifier or with the pure supercritical fluid. In this way the solvent is extracted from the solution and the substance precipitates as fine particles.

The crucial point of the process for fine particle formation is the mixing of the solution with the supercritical fluid: a rapid and intimate mixing causes precipitation of particles and allows a high powder yield to be obtained.

To have a good mixing, the solution has to be dispersed into the supercritical fluid in form of small droplets, thus providing a high interfacial area for mass transfer and a short path for the diffusion of supercritical fluid in the solution droplets and preventing the growth of solute particles. In addition, the enhancement of mass transfer rate between solution and supercritical fluid allows operation at milder temperature and pressure conditions. The present invention permits such operation.

In addition a high ratio between flow rate of supercritical fluid and flow rate of solution allows the creation of a large excess of the supercritical fluid over the solution at the moment of their contact, enhancing the driving force for mass transfer of supercritical fluid into solution and of solvent into supercritical fluid.

As pointed out above, it is necessary to have a good dispersion of the solution into the supercritical fluid in order to obtain very small droplets of solution.

The size of the formed solution droplets is determined by the fluidodynamic conditions in the mixing zone and by the physical properties of solution and supercritical solvent, such as viscosity, surface tension, density. These properties are greatly influenced by temperature and pressure for the supercritical fluid.

The velocity of solution and supercritical fluid at the nozzle outlets is related to the mass flow rate and to the diameter of the outlets. Additionally, it is necessary that the energy pressure of both solution and supercritical fluid are converted into kinetic energy with a minimum energy loss.

To get this aim a new nozzle has been designed.

The solution and the supercritical fluid, pure or mixed with the modifier, are introduced in the particle formation vessel in co-current flow by the nozzle, which provides separate outlets for the supercritical fluid and the solution. Contact between the solution and the supercritical fluid first occurs in the particle formation vessel downstream of the nozzle outlets. This minimises the potential for blockage of the nozzle by the particles which are formed. The respective discharges of the supercritical fluid and the solution can expand and mix in the particle formation vessel.

The nozzle has passages for the respective flows comprising a wide diameter upstream portion which feeds a narrow diameter downstream portion. The narrow diameter portion can be short in order to reduce the pressure drop along this portion so that a better conversion of pressure into kinetic energy is obtained. This overcomes the problems of prior art nozzles which are essentially coaxial tubular arrangements in which a narrow diameter is maintained along the full length of the nozzle with a significant drop in pressure.

The outlets are preferably located adjacent to each other, for example at a centre line spacing of about 3 mm. The outlets are preferably coplanar.

Preferably the nozzle has one central outlet and a plurality of outer outlets. The central outlet may serve to carry a flow of solution and the outer outlets may serve to carry a flow of supercritical fluid. By providing a plurality of outer outlets, mixing of supercritical fluid and the solution is promoted. Preferably the outer outlets are arranged at the same distance from the central outlet. Thus they may be on the same radius, preferably equiangularly spaced. Again, this assists mixing.

The outlets may be at the end of separate tubes or the like. It is however preferred for the outlets to be provided at downstream ends of respective passages through a nozzle body. The passages may for example be laser drillings. The nozzle body may be a disk. Thus a preferred arrangement comprises a nozzle in the form of a disk with an outlet at its center and two or more outlets at the same distance from the center and evenly spaced along a circumference. All the outlets communicate with the interior of the particle formation vessel. The solution is preferably introduced into the particle formation vessel through the central outlet, while the supercritical fluid, pure or with the modifier, is introduced through the outer outlets.

The passages in the nozzle body have upstream ends which in use are fed with the supercritical fluid and the solution, respectively. Preferably, the nozzle body is provided with a seal for sealingly separating respective upstream ends of the passages therethrough. Thus, the use of a nozzle body allows the drilling or other formation of the passages with the ideal dimensions to optimise the fluid flows, whilst these passages can be sealed from each other at their upstream ends. In the case of a central outlet and plural outlets radially outwardly spaced therefrom, the seal may be annular in form (being e.g. an O-ring) and disposed radially outwardly of the central outlet and radially inwardly of the plural outer outlets. A further annular seal is preferably provided radially outwardly of the plural outer outlets. Preferably, the or each seal is received in a groove in the nozzle body, e.g. an annular groove.

The outlets are preferably provided downstream of the apex of conically tapering portions of the nozzle. The passages may be formed with these conically tapering portions. Thus a passage may have a relatively wide diameter portion at its upstream end, for example 1 mm, followed by a conically tapering portion narrowing to a narrow diameter portion, for example 20 microns. The narrow diameter portion is referred to herein as an "orifice". The wide portion and the conical portion may for example be mechanically drilled, whilst the narrow portion or orifice may be laser drilled. The length of the wide portion is substantially greater than the length of the orifice, so as to allow the nozzle body to be relatively thick in the direction of flow, for example 5 mm, and thus easy to handle, without causing the orifice to have an excessive length. The length of the wide portion may for example be at least 5 times, more preferably 10 times, greater than the length of the orifice.

In alternative arrangements, the orifice, with a narrow diameter, may extend through the full thickness of the nozzle body, but this is not preferred as the nozzle body would have to be thin (in the direction of flow) and thus difficult to handle.

The expansion of solution and supercritical fluid thus occurs downstream of orifices. A preferred orifice is characterized by a length to diameter ratio ranging from 5 to 10. It has the advantage over the capillary of minimizing the pressure energy loss and of efficiently converting the pressure energy into kinetic energy.

The nozzle preferably has orifices with diameters ranging from 0.02 to 0.1 mm, more preferably from 0.02 to 0.04 mm, and length ranging from 0.1 to 0.2 mm. Such dimensions allow very high velocities to be obtained at the orifice outlet for both solution and supercritical fluid.

In the preferred embodiments, the plural supercritical fluid outlets are positioned around the solution outlet and at a very short distance (about 3 mm): this configuration allows for the solution to be energized by the supercritical fluid thus enhancing the dispersion of the solution into very fine droplets, providing high interfacial surface between the two phases and fast extraction of solvent into supercritical fluid. These phenomena are particularly efficient when the supercritical fluid velocity at the outlet reaches or is greater than the speed of sound. When the supercritical fluid velocity reaches or is greater than the speed of sound, a Mach disc is formed which causes the dispersion of solution into very fine droplets. This phenomenon is well known and it is widely used in the RESS process (Matson D. W., Fulton J. L., Petersen R. C., Smith R. D., "*Rapid expansion of supercritical fluid solutions: solute formation of powders, thin films, and fibers*" Ind. Eng. Chem. Res., 1987, 26, 2298–2306).

Even if the supercritical fluid velocity is less, but of the order of magnitude of the speed of sound, a substantial enhancement of solution dispersion is obtained (Subramaniam B., Saim S., Rajewskj R. A., Stella V. Methods for particle micronization and nanonization by recrystallization from organic solutions sprayed into a compressed antisolvent. U.S. Pat. No. 5,874,029, Feb. 23, 1999).

It is known that during adiabatic expansion of a real fluid through a convergent-divergent nozzle, the downstream pressure (usually called the critical pressure) for which the supercritical fluid reaches sound velocity is related to upstream pressure by the following relation:

$$\frac{P_c}{P} = \left(\frac{2}{k+1}\right)^{\frac{k}{k-1}}$$

where P is the upstream pressure, $P_c$ is the downstream pressure and k is the ratio between $c_p$ and $c_v$ (specific heat at constant pressure and specific heat at constant volume of the supercritical fluid, respectively). For instance if the supercritical fluid is carbon dioxide, for which k=4.81, if the downstream pressure is 10 MPa, the upstream pressure has to be 38.4 MPa to reach the speed of sound i.e. a pressure drop of 28.4 MPa are required.

However, with pressure drop of about 4 MPa it is possible to get supercritical fluid velocity of the order of magnitude of speed of sound for downstream pressure of 10 Mpa at 40° C.

The speed of sound of a fluid is strongly dependent on pressure and temperature: the minimum value of speed of sound for carbon dioxide in the supercritical region is of 208 m/s at 8 MPa and 40° C. To get the advantage of the above mentioned phenomena it is convenient to work around these operating conditions when carbon dioxide is used as supercritical fluid.

The preferred nozzle used for the apparatus of the present invention has laser drilled orifices. The supercritical fluid velocity at the orifice outlet can be estimated from the energy balance between a section of the supercritical fluid passage upstream of the orifice (section 1) and a section at the orifice outlet (section 2). The energy balance neglecting the energy losses can be calculated by the following equation:

$$H_1 + \tfrac{1}{2}\rho_1 v_1^2 = H_2 + \tfrac{1}{2}\rho_2 v_2^2$$

where $H_1$ and $H_2$ are the specific enthalpies of supercritical fluid upstream and downstream the orifice respectively; $\rho_1$ and $\rho_2$ are the densities of supercritical fluid upstream and downstream the orifice respectively; $v_1$ and $v_2$ are the velocities of supercritical fluid upstream and downstream the orifice respectively.

For the production of fine powders from aqueous solutions with the GAS process using carbon dioxide as supercritical solvent and ethanol as modifier, it has been found that optimal operative conditions are within 8–12 Mpa of pressure and within 35–50° C. of temperature. In the experimental apparatus used for carrying out the experimental tests the supercritical fluid mass flow rate was 30 g/min, the solution flow rate 0.2 g/min, and the modifier mass flow rate 4 g/min, having set the ratio of supercritical fluid to modifier mass flow rate at 7 and the ratio of modifier to solution mass flow rate at 20 and supercritical fluid velocity at the nozzle outlet at about 300 m/s.

As an alternative to what is described above, the supercritical fluid can be ethane, ethylene, propane, sulfur hexafluoride, nitrous oxide, chlorotrifluoromethane, monofluoromethane, xenon and their mixtures; the solvent of the pharmaceutical compound solution can be a supercritical fluid miscible one such as ethanol, methanol, DMSO, isopropanol, acetone, THF, acetic acid, ethyleneglycol, polyethyleneglycol, N,N-dimethylaniline. The same solvents can be used as modifiers when an aqueous solution of pharmaceutical compound is employed.

DESCRIPTION OF THE DRAWINGS

Certain preferred embodiments of the invention will now be described by way of example and with reference to the drawings, wherein:

FIG. 14 is a graph showing the particle size distribution of trehalose produced under the conditions of example 3.

DETAILED DESCRIPTION OF THE INVENTION

Figure 1:
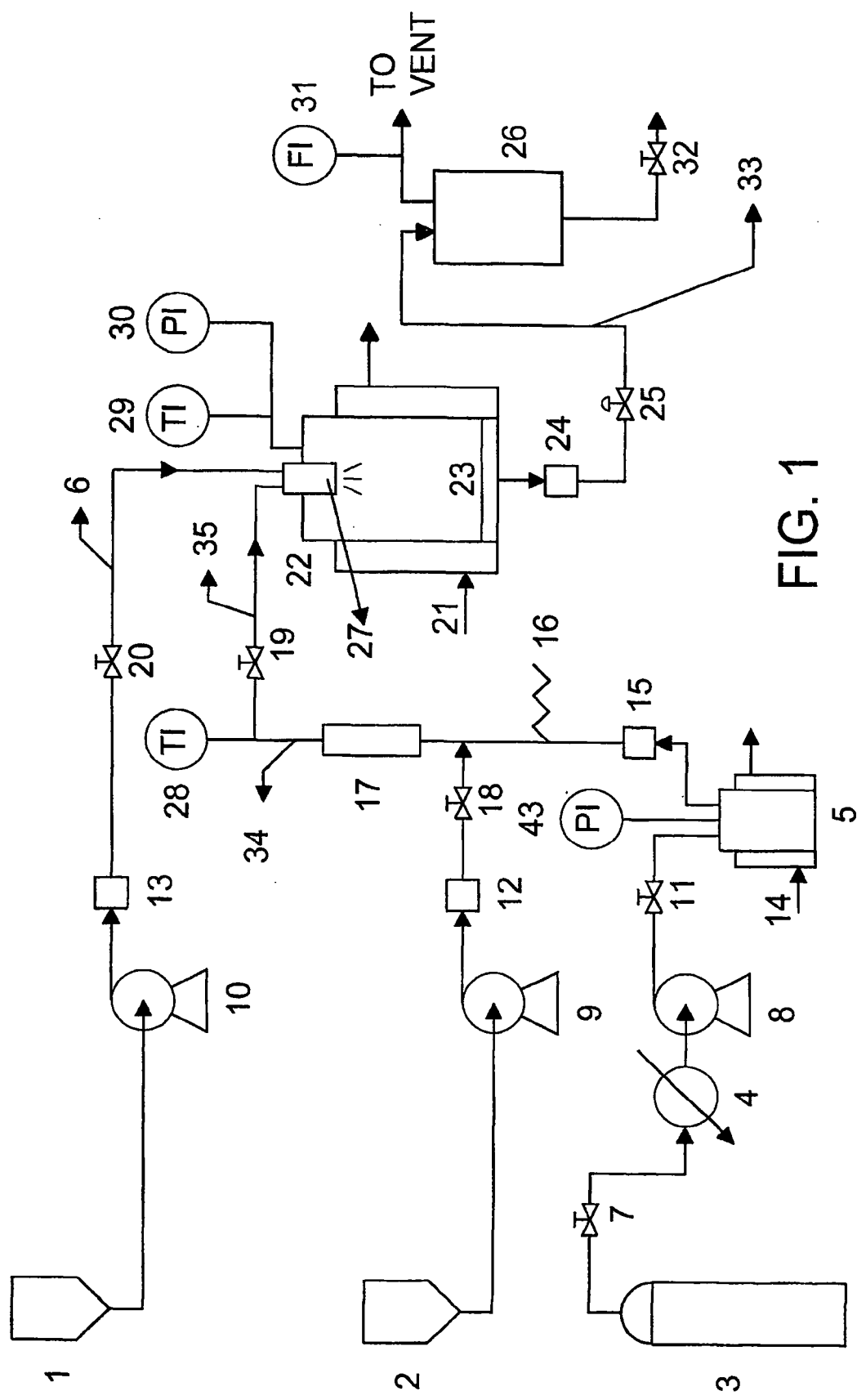
FIG. 1 shows a schematic flow sheet of the apparatus used to carry out the process according to this invention.

Referring to FIG. 1, the apparatus shown includes a particle formation vessel 22. This is a standard reaction vessel of an appropriate volume. The temperature in the vessel is maintained constant by means of a heating jacket 21. The pressure in the vessel is controlled by means of a micro metering valve 25.

The temperature and pressure in the particle formation vessel are measured by means of a thermocouple 29 and a pressure transducer 30.

The particles formed are retained by a filter 23. This is a stainless steel basket, the bottom of which is made by a sintered stainless steel disk (0.5 micron). A second filter 24 (0.5 micron) is put at the vessel outlet.

The supercritical fluid is withdrawn from cylinder 3, it is condensed by cooler 4 and pumped by means of pump 8 to the particle formation vessel through line 34. Prior to entering into the particle formation vessel, the supercritical fluid is heated to the desired temperature by means of pre-heater 14 and heater 17. The pre-heater 14 also acts as pulsation damper. The supercritical fluid is also filtered by means of filter 15 (0.5 micron).

Temperature and pressure of the supercritical fluid prior it enters into the precipitation vessel are measured by means of thermocouple 28 and pressure transducer 43, respectively.

The modifier is withdrawn from tank 2, it is pumped by means of pump 9 to line 34 and it is mixed with the supercritical fluid prior to it entering into the particle formation vessel. The modifier is also filtered by means of filter 12 (0.5 micron).

Line 34 is equipped with a relief valve 16.

The solution is withdrawn from tank 1, it is pumped by means of pump 10 to the particle formation vessel through line 6. The solution is also filtered by means of filter 13 (0.5 micron).

In another version of the process the modifier may be introduced into the particle formation vessel in part with the solution and in part with the supercritical fluid.

The supercritical fluid, pure or mixed with the modifier, and the solution are fed into the particle formation vessel 22 by means of a nozzle 27.

Downstream of the particle formation vessel 22, the mixture of supercritical fluid, modifier and solvent are filtered by means of the filter 24 (0.5 micron) to retain the particles not previously retained by filter 23. The mixture of supercritical fluid, modifier and solvent is depressurised by means of micro metering valve 25, the supercritical solvent is separated from the modifier and the solvent in the separator 26, its flow rate is measured by means of mass flow meter 31 and it is discharged.

Figure 2:
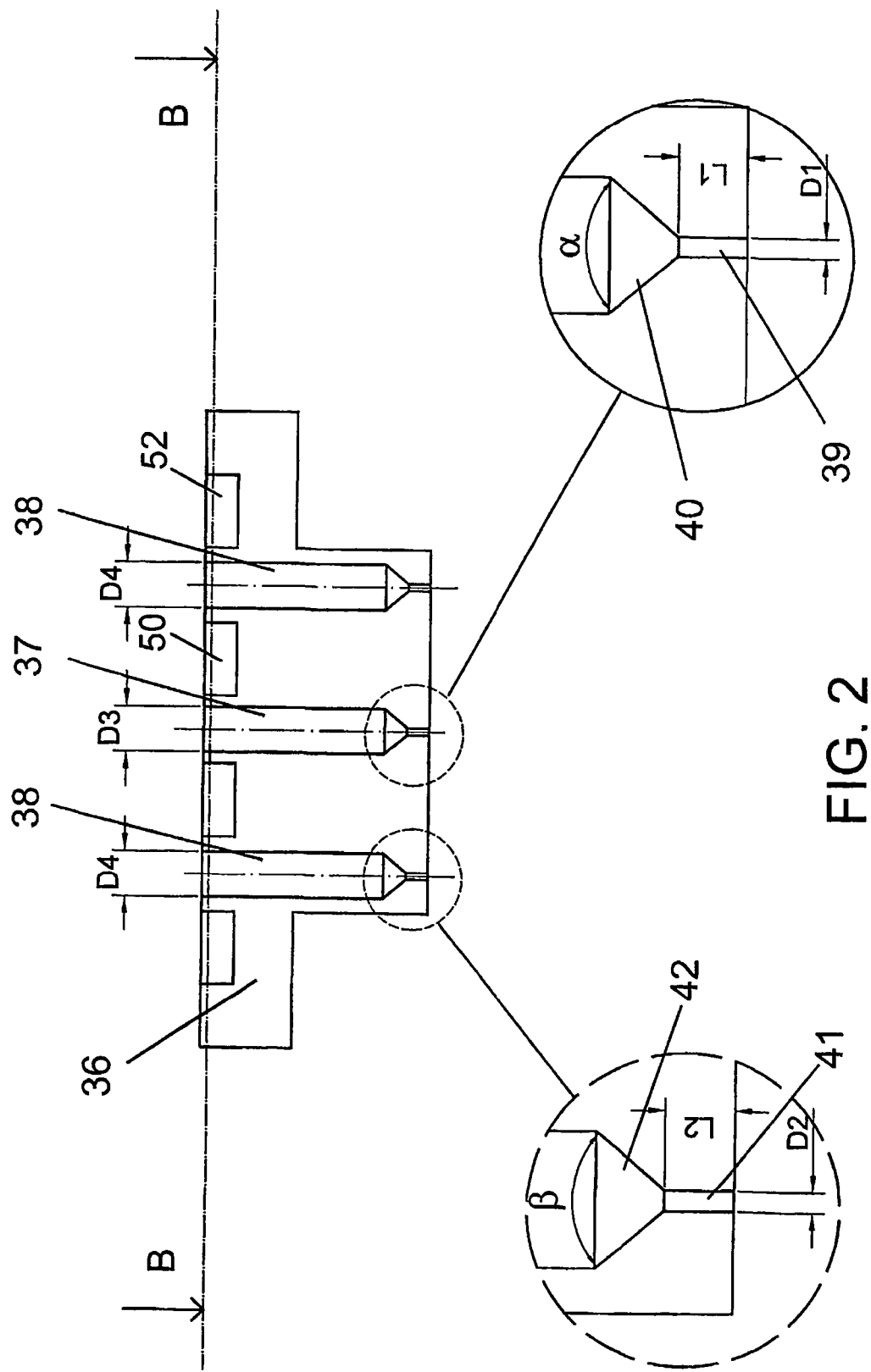
FIG. 2 is a schematic section of the nozzle that is used to carry out the process according to the invention, taken along line A—A of FIG. 3, some parts of the nozzle being shown enlarged in circles.
Figure 3:
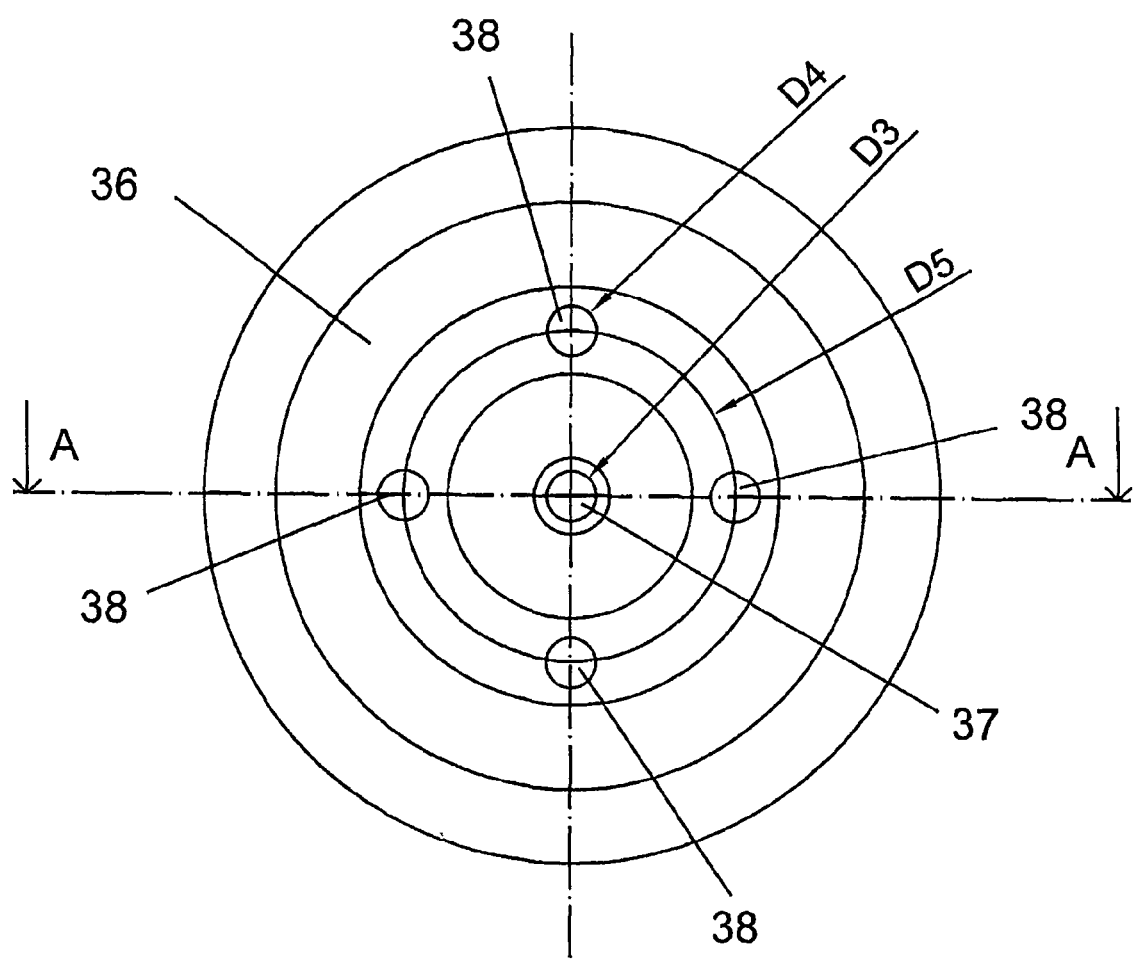
FIG. 3 is a section of the nozzle on the line B—B of FIG. 2.

FIGS. 2 and 3 show the nozzle that is used to carry out the process according to this invention. This nozzle is a distinctive feature of the process according to this invention.

The nozzle allows the introduction of the solution and the supercritical fluid, pure or mixed with the modifier, in the particle formation vessel in co-current flow.

The nozzle provides separate outlets for the supercritical fluid and for the solution. The nozzle may be made of stainless steel, or of other appropriate material.

The nozzle 27 has a nozzle body in the form of a disk 36 with an orifice 39 at its center and two or more orifices 41 drilled at the same distance from the center and evenly spaced along a circumference. The orifices communicate with the interior of the particle formation vessel. The solution is introduced into the particle formation vessel through the central orifice, and the supercritical fluid, pure or with the modifier, is introduced into the particle formation vessel through the outer orifices.

The passage 37 for the solution includes a hole of diameter D3. The end of the hole has a conical shape 40. At the apex of the conical end 40 there is the laser drilled orifice 39. The length L1 of the central orifice is 5 to 10 times its diameter D1. The diameter D1 can be chosen in such a way to obtain any desired velocity of the solution at the orifice outlet.

The passages 38 for the supercritical fluid are holes of diameter D4. The end of each hole has a conical shape 42. At the apex of the conical end 42 there is the laser drilled orifice 41. The length L2 of the orifice is 5 to 10 times its diameter D2. The diameter D2 can be chosen in such a way to obtain any desired velocity of the supercritical fluid at the orifice outlet.

The ratio between length (L1 or L2) and diameter (D1 or D2) of the orifices 39 and 41 are chosen so as to set to a minimum the energy loss and to obtain higher velocities by converting energy pressure into kinetic energy.

Figure 4:
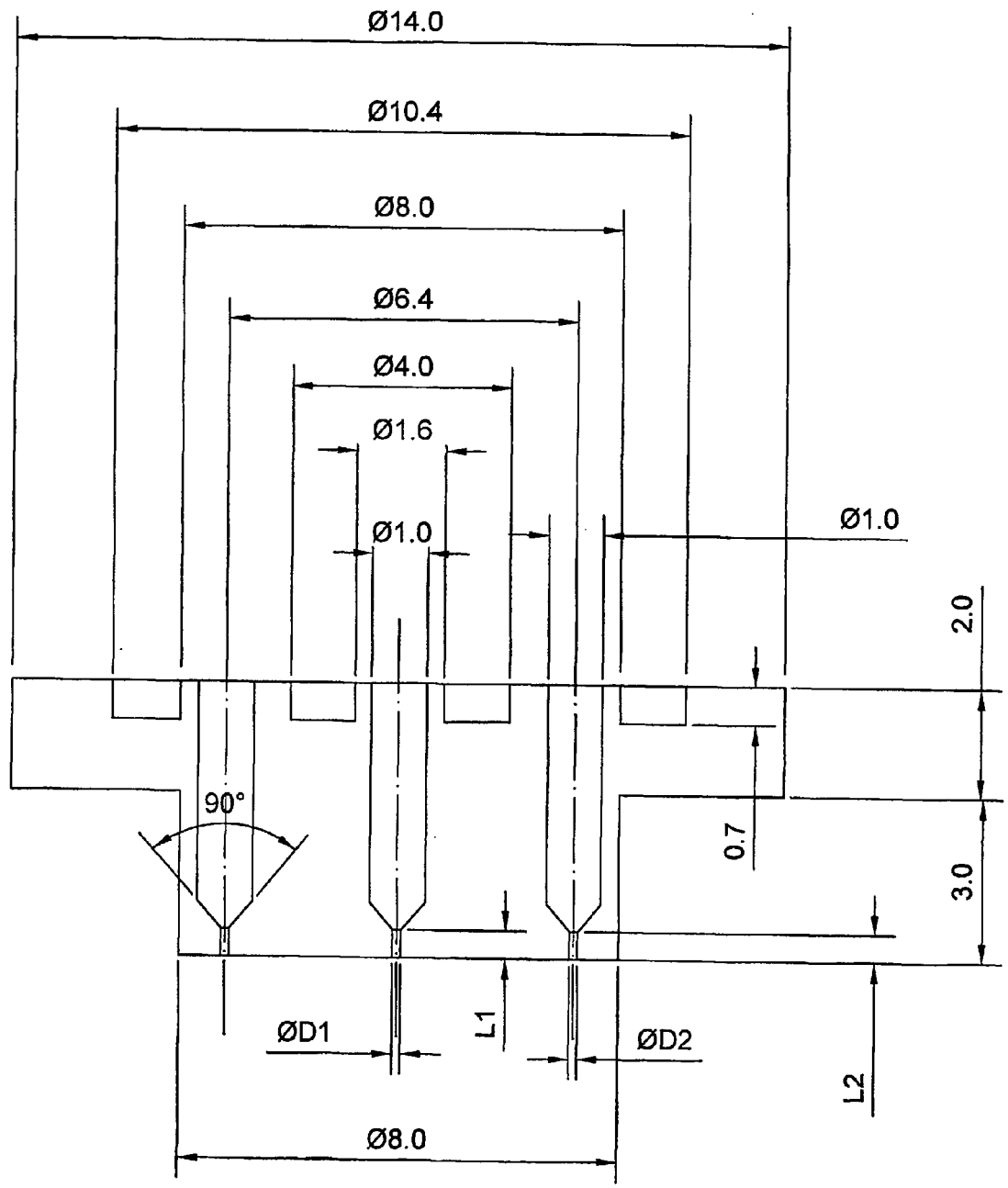
FIGS. 4 and 5 are more detailed views similar to FIGS. 2 and 3, respectively.
Figure 5:
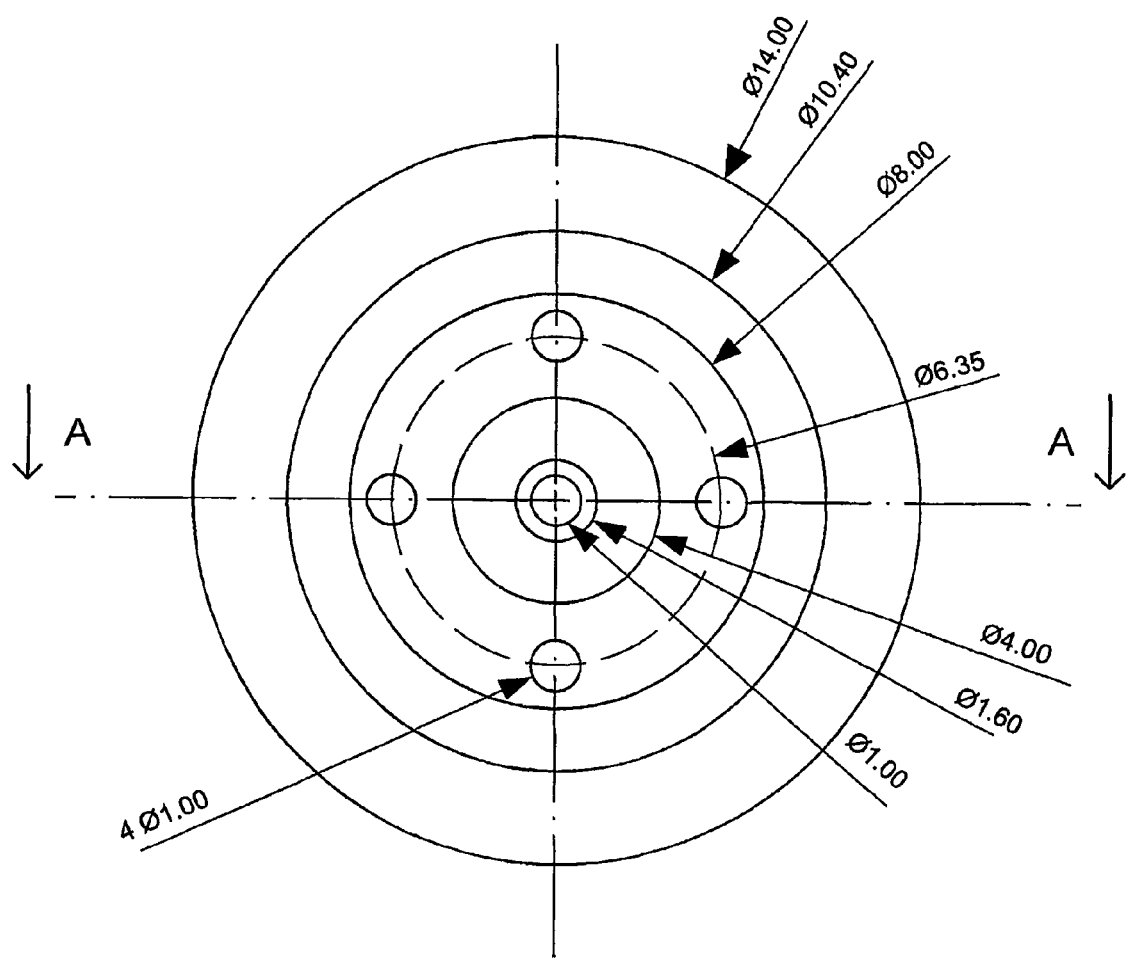

In FIGS. 4 and 5 detailed drawings of the nozzle used in the present invention are shown. Orifices can be drilled with diameters down to 0.02 mm. The nozzles that have been used for carrying out the experimental tests have orifices of diameter ranging from 0.02 to 0.04 mm.

In another embodiment of the invention, one or more of the outer orifices are drilled in such a way that their axes converge on the axis of the central orifice. The angle formed by the axes of the outer orifices with the axis of the central orifice is comprised between 1 and 30°.

The upper surface of the disk 36 of the nozzle 27 is formed with an inner annular groove 50 which extends round the inlet end of the central passage 37, and an outer annular groove 52 which extends round the inlet ends of the passages 38.

Figure 6:
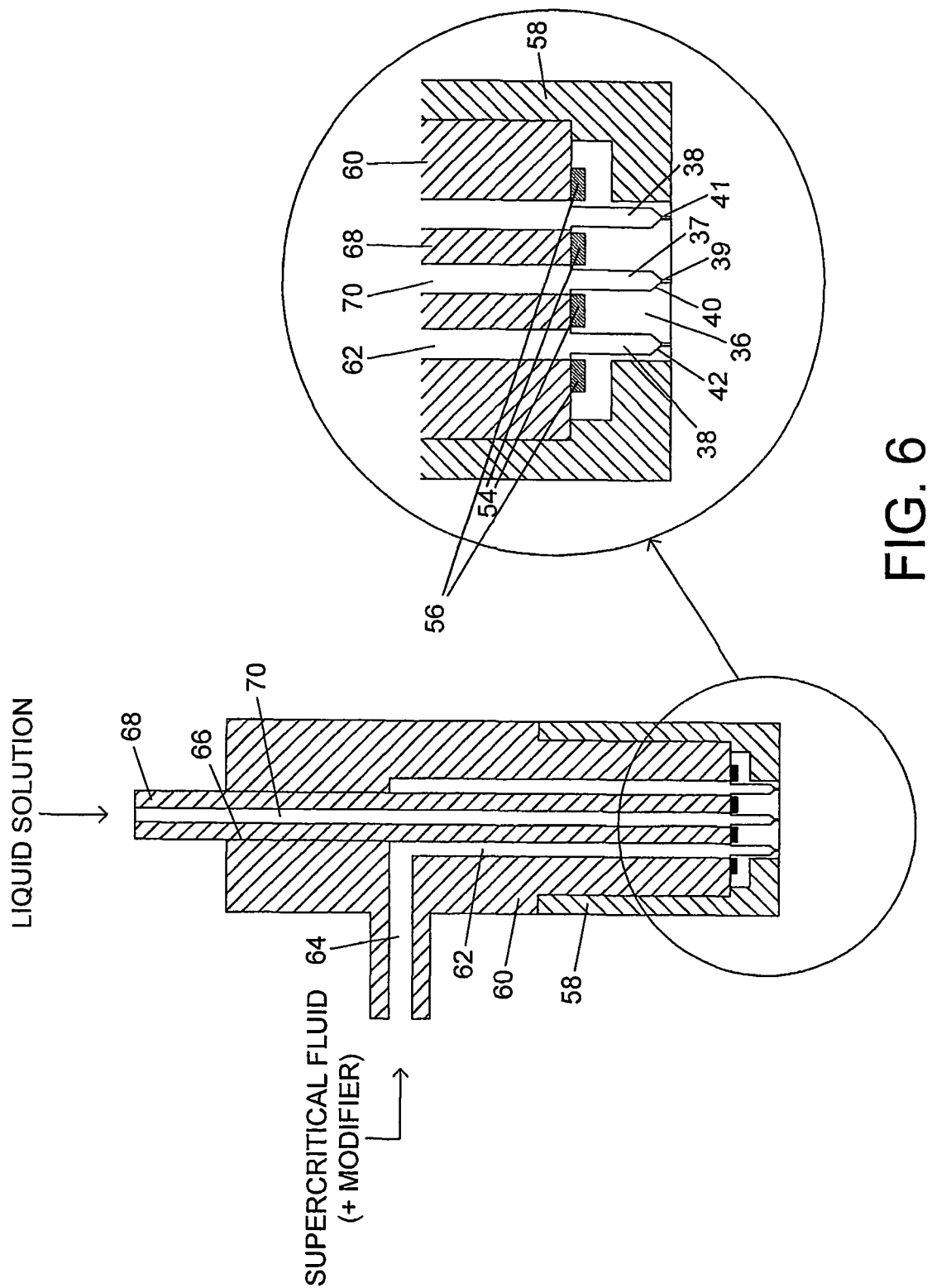
FIG. 6 is a sectional view of the nozzle arrangement.

FIG. 6 shows the assembly of the nozzle 27. The annular groove 50 of the disk 36 receives a first O-ring seal 54 and the outer annular groove 52 receives a second O-ring seal 56. The disk 36 is received in a cup 58, which also receives a nozzle block 60, the lower end of which is in engagement with the second O-ring seal 56. Over the lower part of its length the nozzle block 60 is provided with a central lower bore 62 which communicates at its upper end with a lateral bore 64. Over the upper part of its length the nozzle block 60 has a central upper bore 66. A nozzle shaft 68 extends along the central upper and lower bores 66, 62 and has a lower end in engagement with the first O-ring seal 54. The nozzle shaft 68 is formed with a central shaft bore 70. A further seal (not shown) would normally be provided around the nozzle shaft 68 to seal against the upper part of the nozzle block 60.

In use, liquid solution is fed to the central shaft bore 70 and from there to the inlet end of the central passage 37 through the disk 36. The junction between the central shaft bore 70 and the disk 36 is sealed by the first O-ring seal 54. Supercritical fluid, optionally with a modifier, is fed to the lateral bore 64 which communicates with the central lower bore 62, and from there to the passages 38 through the disk 36. The junction between the central lower bore 62 and the passages 38 is sealed on the inside by the first O-ring seal 54 and on the outside by the second O-ring seal 56.

The solution emerges from the central orifice 39 at high velocity and it is broken in fine droplets coming in contact with the supercritical fluid. The breaking of the solution liquid jet is highly enhanced by the supercritical fluid emerging from orifices 41, provided that the supercritical fluid velocity is very high, of the order of magnitude the velocity of sound at the working temperature and pressure. The effect of the supercritical fluid in enhancing the breaking of the solution liquid jet is a crucial one and determines the shape, size and yield of the product.

Experimental Procedure

The supercritical fluid is fed to the precipitation vessel by means of pump 8, which allows setting of the supercritical fluid flow rate. The temperature of the supercritical fluid flowing in line 35 is set by means of heater 17 to a higher value than the temperature inside the particle formation vessel, to take into account the temperature lowering due to the expansion through the nozzle orifices. The modifier is then added at a predetermined flow rate to the supercritical fluid by means of pump 9. The solution is pumped by means of pump 10 into the particle formation vessel when steady state conditions are attained.

After that a certain amount of solution is fed to the particle formation vessel, pumps 9 and 10 are stopped and only the supercritical fluid is fed to the particle formation vessel until the precipitated powder is free of solvent and modifier.

The particle formation vessel is depressurised and the powder is recovered.

EXAMPLES

The following examples were carried out using a method according to the present invention. The apparatus used is similar to that shown in FIG. 1.

Example 1

Preparation of Alkaline Phosphatase (ALP) Particles

In this example, the method of the invention is used to prepare protein powders using alkaline phosphatase (ALP).

A solution of ALP (SIGMA Chemicals) in deionized water at a concentration of 0.2% w/w is used. Carbon dioxide and ethanol are used as supercritical fluid and as modifier, respectively.

The solution is fed into the particle formation vessel 22 by means pump 10 at a flow rate of 0.2 g/min. Supercritical carbon dioxide is fed by means pump 8 at a flow rate of 30 g/min, ethanol is fed by means pump 9 to line 34 at a flow rate of 4 g/min and it is mixed with supercritical carbon dioxide prior to entry into the particle formation vessel.

The supercritical fluid is injected into the particle formation vessel through the four external orifices of the nozzle, each with a diameter of 0.04 mm. The solution is injected into the particle formation vessel through the central orifice of the nozzle, having a diameter of 0.04 mm. The length of all orifices is 0.2 mm.

Temperature and pressure in particle formation vessel are maintained at T=40° C. and P=10.0 MPa. Precipitated particles are collected on the filter 23 at the bottom of particle formation vessel, while supercritical fluid, modifier and water are collected into cylinder 26 at atmospheric pressure.

The solution and the carbon dioxide with the modifier have been fed for 240 min, after the solution feed has been stopped, pure carbon dioxide has been fed into particle formation vessel in order to extract any trace of solvent and modifier from the precipitated powders. Typically, the particles formation vessel was washed with two volumes of carbon dioxide in order to obtain dry powders.

After depressurization, the particle formation vessel is opened and the powders are recovered.

The yield of the collected powder, was about 70%.

Figure 7:
FIGS. 7 and 8 are SEM photomicrographs of SIGMA ALP produced under the conditions of example 1.
Figure 8:
Figure 9:
FIGS. 9, 10 and 11 are SEM photomicrographs of SIGMA lysozyme produced under the conditions of example 2.
Figure 10:
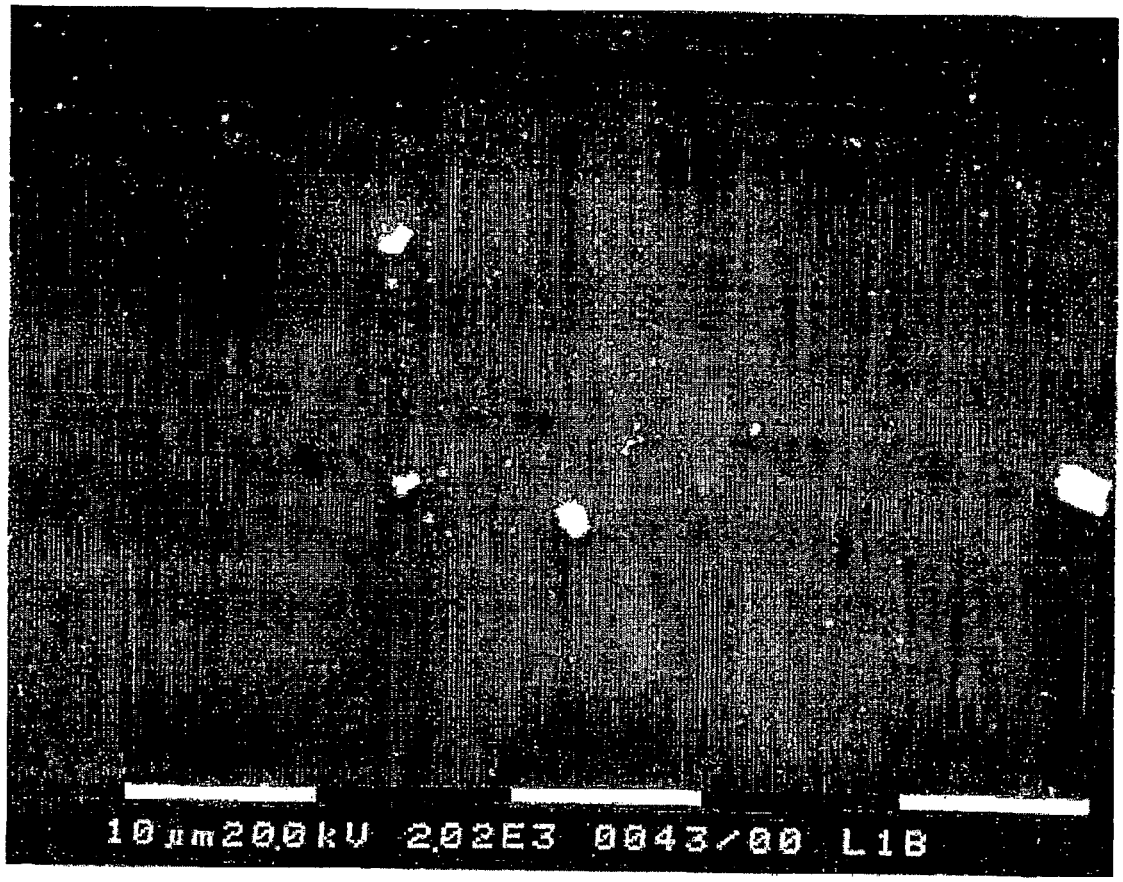
Figure 11:
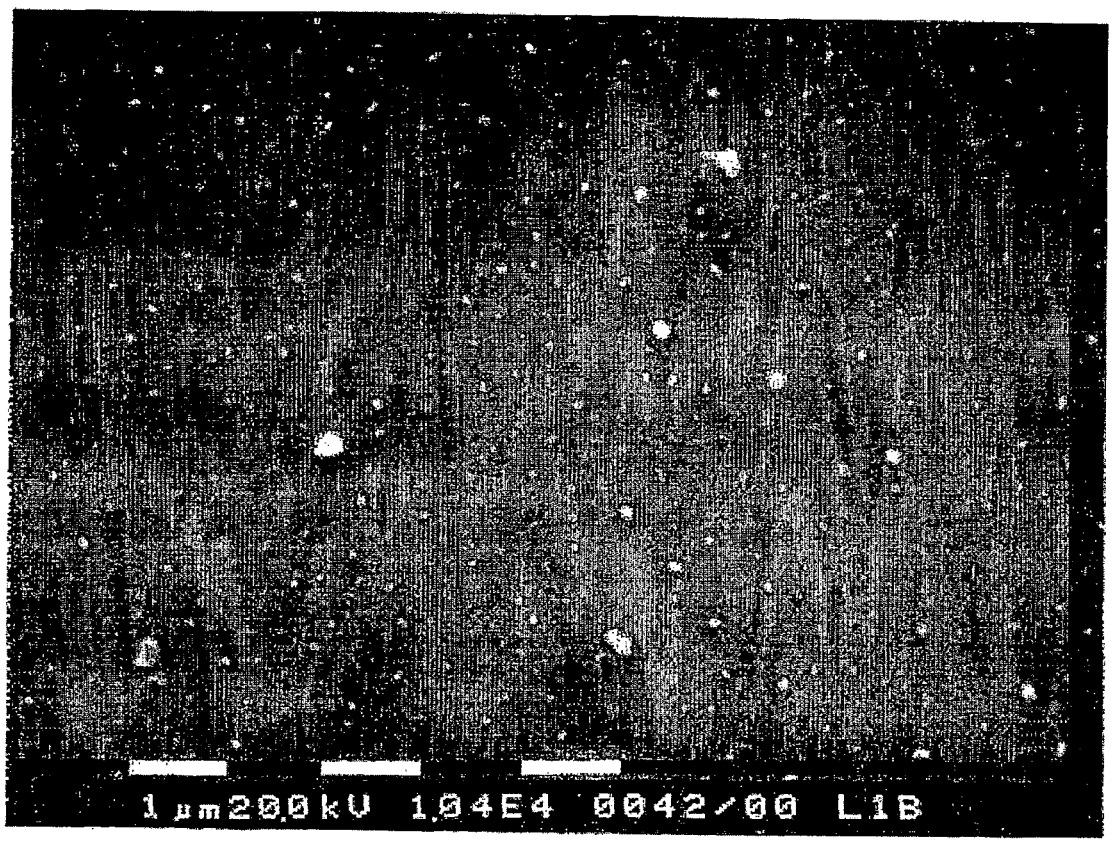
Figure 12:
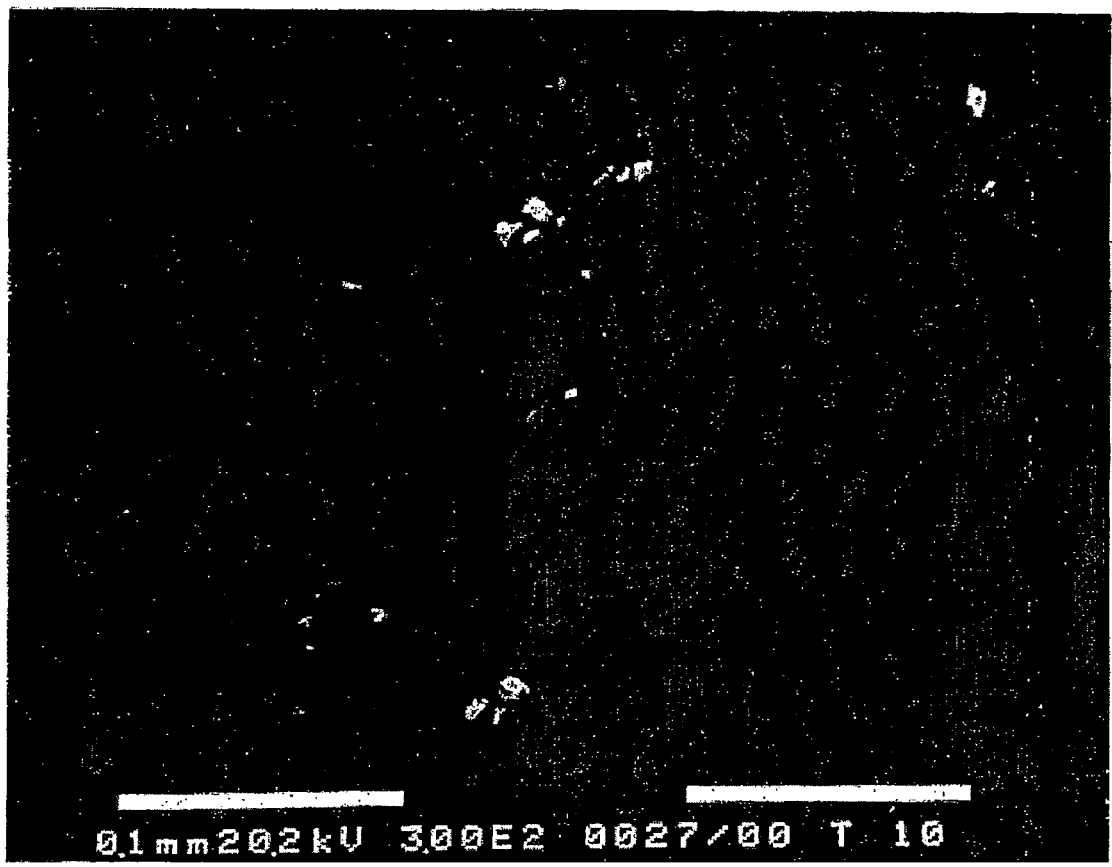
FIGS. 12 and 13 are photomicrographs of trehalose produced under the conditions of Example 3.
Figure 13:
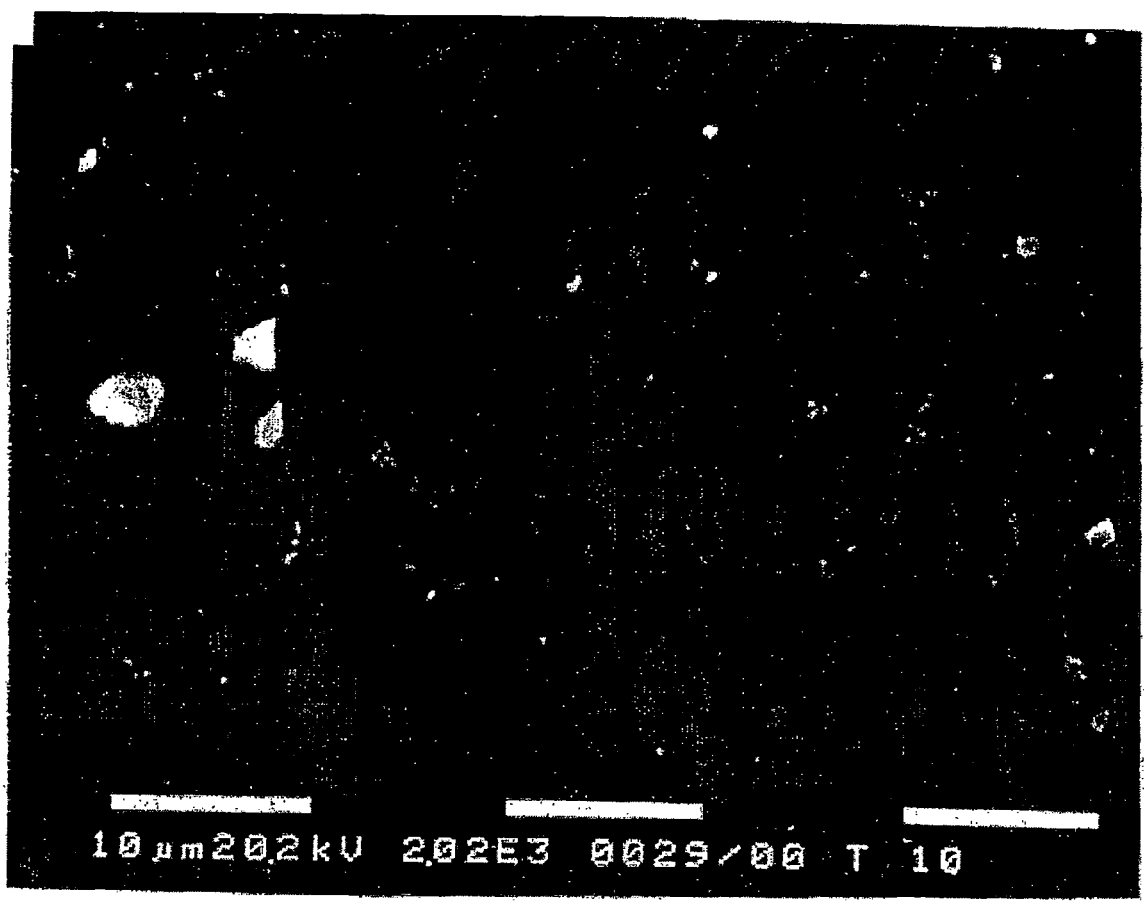

The SEM micrographs (FIGS. 7, 8) show that the obtained powders have an equivalent diameter of less then 1 μm and a narrow size distribution.

The found residual enzymatic activity of ALP was 90%, compared to the unprocessed commercial reagent.

Example 2

Preparation of Lysozyme Particles

In this example, the method of the invention is used to prepare protein powders using Lysozyme.

A solution of Lysozyme (SIGMA Chemicals) in deionized water at a concentration of 0.2% w/w is used. Carbon dioxide and ethanol are used as supercritical fluid and as modifier, respectively.

The solution is fed into the particle formation vessel 22 by means of pump 10 at a flow rate of 0.2 g/min. Supercritical carbon dioxide is fed by means of pump 8 at a flow rate of 30 g/min, ethanol is fed by means of pump 9 to line 34 at a flow rate of 4 g/min and it is mixed with supercritical carbon dioxide prior to entry into the particle formation vessel.

The supercritical fluid is injected,into the particle formation vessel through the four external orifices of the nozzle, each with a diameter of 0.04 mm. The solution is injected into the particle formation vessel through the central orifice of the nozzle, having a diameter of 0.04 mm. Length of all orifices is 0.2 mm.

Temperature and pressure in particle formation vessel are maintained at 40° C. and 10.0 Mpa respectively.

Precipitated particles are collected on the filter 23 at the bottom of particle formation vessel, while supercritical fluid, modifier, water and solute eventually not precipitated are collected into cylinder 26 at atmospheric pressure.

After that a certain amount of solute is fed into particles formation vessel, pumps 9 and 10 are stopped and only supercritical fluid is fed into particles formation vessel in order to dry the precipitated powders: typically, it needs about two times the volume of the particles formation vessel to obtain dry powders.

At this point, it is possible to depressurise the particle formation vessel, to open and to recover the powders.

The yield of recovered powder was 90%.

The SEM micrographs (FIGS. 9, 10, 11) show that the obtained powders have an equivalent diameter of less then 1 μm and a narrow size distribution.

The found residual enzymatic activity of ALP was 94%, compared to the unprocessed commercial reagent.

Example 3

Preparation of Trehalose Particles

In this example, the method of the invention is used to prepare trehalose powders from aqueous solutions.

A solution of trehalose dihydrate (SIGMA Chemicals) in deionized water at a concentration of 2% w/w is used. Carbon dioxide and ethanol are used as supercritical fluid and as modifier, respectively.

The solution is fed into the particle formation vessel 22 by means pump 10 at a flow rate of 0.2 g/min. Supercritical carbon dioxide is fed by means pump 8 at a flow rate of 30 g/min, ethanol is fed by means pump 9 to line 34 at a flow rate of 4 g/min and it is mixed with supercritical carbon dioxide prior to entry into the particle formation vessel.

The supercritical fluid is injected into the particle formation vessel through the four external orifices of the nozzle, each with a diameter of 0.04 mm. The solution is injected into the particle formation vessel through the central orifice of the nozzle, having a diameter of 0.04 mm. Length of all orifices is 0.2 mm.

Temperature and pressure in the particle formation vessel are maintained at 40° C. and 10.0 Mpa respectively.

Precipitated particles are collected on the filter 23 at the bottom of particle formation vessel, while supercritical fluid, modifier, water and solute eventually not precipitated are collected into cylinder 26 at atmospheric pressure circa.

After that a certain amount of solute is fed into particle formation vessel, pumps 9 and 10 are stopped and only supercritical fluid is fed into particle formation vessel in order to dry the precipitated powders: typically, it needs about two times the volume of the particles formation vessel to obtain dry powders.

At this point, it is possible to depressurise the particle formation vessel, to open and to recover the powders.

The yield of recovered powder was 80%.

FIGS. 12 and 13 are SEM micrographs of the obtained powders.

The particle size distribution shown in FIG. 14 has been determined using an Aerosizer mo. 3225 (TSI-Amherst) and gives a mean size of 1.89 μm.

The invention may be understood in somewhat broader terms. Thus, according to one broad aspect the invention provides apparatus for micron and submicron particle formation of a substance using the GAS process, comprising a particle formation vessel and means for introducing a solution of the substance and a supercritical fluid into said particle formation vessel, characterized in that said means comprise a nozzle having separate outlets for the solution and the supercritical fluid respectively.

According to another broad aspect the invention provides a nozzle for the introduction of a solution of a substance and a supercritical fluid in a particle formation vessel for micron and submicron particle formation of said substance using the GAS process, characterized in that the nozzle comprises a central outlet to carry a flow of solution and a plurality of outer outlets to carry a flow of pure supercritical fluid or a flow of supercritical fluid mixed with a modifier.

According to a further broad aspect the invention provides a process for micron and submicron particle formation of a substance using the GAS process, comprising the feeding of a supercritical fluid, pure or mixed with a modifier, and of a solution, through separate inlets of a nozzle, into a particle formation vessel at controlled pressure and temperature, such that the solvent is extracted from solution by the supercritical fluid and precipitation of micron and submicron particles occurs.

The invention claimed is:

1. An apparatus for particle formation of a substance using the gas anti-solvent recrystallization (GAS) process, comprising:

a particle formation vessel;

means for introducing a solution of the substance and a supercritical fluid into said particle formation vessel, said means comprising a nozzle having respective passages for the solution and the supercritical fluid and separate outlets at downstream ends of the respective passages, such that in use contact between the solution and the supercritical fluid first occurs in the particle formation vessel downstream of the separate outlets, wherein the passages comprise a wide diameter upstream portion which feeds a narrow diameter downstream portion.

2. The apparatus as claimed in claim 1, wherein said nozzle has one central outlet and a plurality of outer outlets, the central outlet serving to carry a flow of solution, and the outer outlets serving to carry a flow of pure supercritical fluid.

3. The apparatus as claimed in claim 2, wherein said outer outlets are arranged at the same distance from said central outlet.

4. The apparatus as claimed in claim 1, wherein the nozzle comprises a nozzle body and said respective passages extend through the nozzle body.

5. The apparatus as claimed in claim 4, wherein the nozzle body is provided with a seal for sealingly separating respective upstream ends of the passages therethrough.

6. The apparatus as claimed in claim 5, wherein the seal is received in a groove in the nozzle body.

7. The apparatus as claimed in claim 1, wherein the nozzle has conically tapering portions, said tapering portions having an apex, and wherein said outlets are provided downstream of the apex of the conically tapering portions.

8. The apparatus as claimed in claim 1, wherein the outlets are at the downstream ends of orifices, the diameter of said orifices being between 0.02 and 0.1 mm, and a length to diameter ratio of said orifices being between 5 and 10.

9. The apparatus as claimed in claim 8, wherein the diameter of said orifices is between 0.02 and 0.04 mm.

10. The apparatus as claimed in claim 1, wherein the outlets are at the downstream ends of orifices drilled in such a way that their axes converge, the angle formed between the axes being between 1 and 30°.

11. The apparatus as claimed in claim 1, farther comprising means for introducing a modifier in said particle formation vessel through said nozzle.

12. The apparatus as claimed in claim 1, wherein a respective outlet carries a flow of the solution mixed with a modifier.

13. The apparatus as claimed in claim 1, wherein a respective outlet carries a flow of the supercritical fluid mixed with a modifier.

14. A nozzle for particle formation of a substance in a particle formation vessel using the gas anti-solvent recrystallization (GAS) process, the nozzle being for the introduction of a solution of said substance and a supercritical fluid in the particle formation vessel for particle formation of said substance, the nozzle comprising:

respective passages for the solution and the supercritical fluid and separate outlets at downstream ends of the respective passages, such that in use contact between the solution and the supercritical fluid first occurs downstream of the separate outlets, wherein the passages comprise a wide diameter upstream portion which feeds a narrow diameter downstream portion.

15. The nozzle as claimed in claim 14, comprising a central outlet to carry a flow of solution and a plurality of outer outlets to carry a flow of pure supercritical fluid or a flow of supercritical fluid mixed wit a modifier.

16. A process for particle formation of a substance using the gas anti-solvent recrystallization (GAS) process, comprising:

the feeding of a supercritical fluid, pure or mixed with a modifier, and of a solution of the substance wherein said solution comprises a solvent, through a nozzle, into a particle formation vessel at controlled pressure and temperature, such that the solvent is extracted from solution by the supercritical fluid and precipitation of particles of the substance occurs, wherein the supercritical fluid and the solution are fed through respective passages of the nozzle to exit therefrom via separate outlets at downstream ends of the respective passages, with contact between the supercritical fluid and the solution first occurring in the particle formation vessel downstream of the separate outlet, and wherein the passages comprise a wide diameter upstream portion which feeds a narrow diameter downstream portion.

17. The process as claimed in claim 16, wherein said solution is introduced into the particle formation vessel mixed with the modifier.

18. The process as claimed in claim 16, wherein said supercritical fluid is selected from the group consisting of ethane, ethylene, propane, sulfur hexafluoride, nitrous oxide, chlorotrifluoromethane, monofluoromethane, xenon and their mixtures.

19. The process as claimed in claim 16, wherein said modifier is selected from the group consisting of ethanol, methanol, DMSO (Dimethyl Sulfoxide), isopropanol, acetone, THF (Tetrahydrofuran), acetic acid, ethyleneglycol, polyethylencglycol, and N,N-dimethylaniline.

20. The process as claimed in claim 16, wherein the solution is an aqueous solution and contains the substance, the substance comprises a compound, the supercritical fluid is carbon dioxide and the modifier is ethanol.

21. The process as claimed in claim 20, wherein the pressure in the particle formation vessel is between the critical pressure of carbon dioxide and 30 MPa and the temperature in the particle formation vessel is between 30 and 80° C.

22. The process as claimed in claim 21, wherein the ratio between the mass flow rate of carbon dioxide and modifier is between 2 and 40 and the ratio between the mass flow rate of modifier and of aqueous solution is between 5 and 40.

23. The process as claimed in claim 21, wherein the critical pressure is between 8 and 12 MPa and the temperature of the particle formation vessel is between 40° and 50° C.

24. The process as claimed in claim 22, wherein the carbon dioxide velocity at the respective nozzle outlet is of the order of magnitude of the speed of sound in the carbon dioxide at the temperature and pressure in the particle formation vessel.

25. The process as claimed in claim 22, wherein the ratio between the mass flow rate of the carbon dioxide and modifier is between 6 and 8 and the ratio between the mass flow rate of modifier and of aqueous solution is between 10 and 25.

* * * * *